United States Patent [19]
Ratzlaff et al.

[11] Patent Number: 5,819,515
[45] Date of Patent: Oct. 13, 1998

[54] EASED INLET TAILGATE ROLL ARRANGEMENT FOR VARIABLE CHAMBER ROUND BALER

[75] Inventors: Howard J. Ratzlaff, Hesston; J. Dale Anderson, Canton; Craig Pecenka, Hesston; Ferol S. Fell, Newton, all of Kans.

[73] Assignee: Hay & Forage Industries, Hesston, Kans.

[21] Appl. No.: 731,395

[22] Filed: Oct. 18, 1996

[51] Int. Cl.⁶ ..................................................... A01F 15/07
[52] U.S. Cl. ................................................. 56/341; 100/88
[58] Field of Search .............................. 56/341, 342, 343, 56/344; 100/88, 89

[56] References Cited

U.S. PATENT DOCUMENTS

| | | | |
|---|---|---|---|
| 4,172,354 | 10/1979 | Vermeer et al. | 56/341 |
| 4,319,446 | 3/1982 | Arnold et al. | |
| 4,375,187 | 3/1983 | Kluver et al. | 56/341 X |
| 4,597,254 | 7/1986 | Bowden, Jr. | 56/341 |
| 4,771,595 | 9/1988 | Jennings | 56/341 |
| 4,956,968 | 9/1990 | Underhill. | |
| 5,097,760 | 3/1992 | Ratzlaff et al. | |
| 5,595,055 | 1/1997 | Horchler, Jr. et al. | 56/341 |

*Primary Examiner*—Terry Lee Melius
*Attorney, Agent, or Firm*—Hovey, Williams, Timmons & Collins

[57] ABSTRACT

The round baler has a plurality of transverse rolls and a plurality of laterally spaced belts entraining the rolls, wherein the rolls and belts cooperatively define a baling chamber expandable from an initial, generally upright, bale-starting configuration. The baling chamber has a crop intake opening adjacent the bottom of the chamber through which crop material is delivered to the chamber during formation of a bale. The rolls include a lower front roll and a lower rear roll which are located behind the intake opening. The lower rear roll has a bale supporting surface that is positioned generally upwardly and rearwardly from the front roll for supporting the bale during formation thereof at a point spaced upwardly and rearwardly from the intake opening. The belts include a stretch that extends generally upwardly from the front roll when the chamber is in the bale-starting configuration and shifts into engagement with the rear roll as the chamber expands, whereby the belt stretch presents a moving surface extending generally rearwardly and upwardly from the front roll to the rear roll for delivering crop material from the intake opening to the bale.

18 Claims, 3 Drawing Sheets

EASED INLET TAILGATE ROLL ARRANGEMENT FOR VARIABLE CHAMBER ROUND BALER

CROSS-REFERENCE TO RELATED APPLICATIONS

See also the following contemporaneously filed applications for U.S. Letters Patent: Ser. No. 08/731,768, entitled ROUND BALER HAVING TAILGATE-RESPONSIVE CLUTCH; Ser. No. 08/733,764, entitled DOWN TURNING STUB AUGERS ON WIDE PICK-UP FOR ROUND BALERS; Ser. No. 08/733,758, entitled OVER-THE-TOP SUPPORT ARM FOR PICK-UP GAUGE WHEEL OF A BALER; Ser. No. 08/733,757, entitled TALL SLEEVES FOR ROUND BALER DRIVE ROLLS; and Ser. No. 08/731,767, entitled END OF ROUND BALE TWINE GUIDES.

BACKGROUND OF THE INVENTION

1. Field of the Invention

The present invention relates generally to variable chamber, belt-type round balers and, more particularly, to an improved crop inlet configuration that serves to create a larger, more aggressive nip between the lower boundary of the bale and the belts so as to improve bale formation, without eliminating the initial, generally upright, bale-starting configuration of the baling chamber.

2. Discussion of Prior Art

In the past, some variable chamber, belt-type round balers have had a pair of generally fore-and-aft spaced inlet rolls located generally at the bottom of the baling chamber to define the crop intake opening or inlet. The aft inlet roll serves as the guide roll from which the belts extend upwardly to form the rear boundary of the initial, generally upright, bale-starting chamber and therefore its position within the baler is relatively important. As those of ordinary skill in the art will appreciate, the initial, so-called "vertical chamber" is extremely effective in establishing a bale core, which is essential for productive baling operations. However, it has been determined that the configuration of the intake opening with the traditional aft inlet roll can sometimes be problematic during the latter stages of bale formation.

The aft inlet roll is often larger than others and in such a position within the crop intake opening that, in certain crop conditions after the bale has been partially formed, the roll tends to inhibit flow of crop material through the opening and to the bale. More particularly, the aft inlet roll traditionally serves as the primary bale supporting roll, upon which the bale rests during formation thereof. That is to say, after the bale core has been established within the initially vertical chamber, the center of gravity of the bale shifts rearwardly as the bale and chamber expand, and consequently, the aft inlet roll becomes the primary support for the bale. The aft inlet roll also typically serves as the terminal roll about which the belts loop, thereby cooperating with the bale, once it has moved rearwardly, to form a wedge-shaped intake nip through which crop material flows to become part of the bale. However, because the bale is supported directly upon the aft inlet roll, the wedge presented between the bale and belts is relatively small, which limits the aggressiveness of the nip. Moreover, between the fore-and-aft inlet rolls, the bale has a tendency to sag into the crop intake opening during formation thereof (i.e., it does not maintain a perfectly circular cross-section). As the bale revolves, its sagging portion abruptly engages the forward surface of the inlet roll, which tends to obstruct the inflow of crop material and diminish the aggressiveness of the intake nip.

These problems are magnified in wet silage conditions, wherein the crop material is dense and tends to segregate into clumps of dense material. These problems are also magnified to some extent when fork-type stuffers are utilized for transferring crop material from the pickup to the intake opening. As those of ordinary skill in the art will appreciate, the stuffer serves to present successive charges of crop material to the opening. Indeed, clumps or charges of hay, especially when wet, demand that the nip defined between the bale and belts is unobstructed and highly aggressive so that inflowing crop material is effectively added to the revolving bale.

OBJECTS AND SUMMARY OF THE INVENTION

Responsive to these problems, an important object of the present invention is to provide a variable chamber round baler with a crop intake opening that is highly effective in delivering crop material to the bale during formation thereof. It is also an object of the present invention to provide an opening configuration that creates an effective aggressive intake nip between the bale and belts once the bale has moved rearwardly within the baler, without eliminating the initial, generally upright, bale-starting chamber. Another object of the present invention is to provide a baler which is particularly effective in baling wet silage crop. Yet another object of the present invention is to provide a crop intake opening that is particularly useful with variable chamber round balers having a fork-type stuffer for delivering successive charges of crop material from the pickup to the chamber.

In accordance with these and other objects evident from the following description of a preferred embodiment of the invention, the round baler includes a plurality of transverse rolls and a plurality of laterally spaced belts entraining the rolls, wherein the rolls and belts cooperatively define a baling chamber expandable from an initial, generally upright, bale-starting configuration. The baling chamber has a crop intake opening adjacent the bottom of the chamber through which crop material is delivered to the chamber during formation of a bale. A pair of strategically positioned rolls behind the opening serve to make a "live surface", rearwardly inclined, infeed ramp out of the belts as the growing bale deflects the belts rearwardly, thereby enlarging the intake nip or wedge and making it more aggressive. Yet, the two rolls also permit the belts to return to their upright position after the bale has been discharged, thus restoring the "vertical" starting configuration for the chamber.

The rolls include a lower front roll and a lower rear roll which are located behind the opening. The rear roll has a bale supporting surface that is positioned generally upwardly and rearwardly from the front roll for supporting the bale during formation thereof at a point spaced upwardly and rearwardly from the opening. The belts include a stretch that extends generally upwardly from the front roll when the chamber is in the bale-starting configuration and lays down into engagement with the rear roll as the chamber expands, whereby the belt stretch presents a moving surface extending generally rearwardly and upwardly from the front roll to the rear roll for delivering crop material to the bale.

Preferably, the front and rear rolls are disposed along an axis extending generally upwardly and rearwardly from the intake opening that is substantially parallel to the moving surface. Additionally, the preferred rolls have substantially similar cross-sectional diameters. Furthermore, the intake opening is defined by the lower front roll and another one of the rolls entrained by the belts.

If desired, the round baler may be constructed so that its pickup is positioned ahead of the bale chamber's intake opening, rather than directly below the opening. In this event, the round baler is provided with intermediate transfer mechanism for moving picked up crop material from the pickup to the baling chamber. The preferred transfer mechanism includes a fork-type stuffer for presenting successive charges of material to the chamber. The stuffer preferably includes a plurality of laterally spaced prongs which project upwardly through slots in a floor ramp and are cranked along a generally kidney-shaped path extending between the pickup and opening. The preferred ramp is substantially parallel to and generally aligned with the moving surface presented by the belts. Alternatively, the pickup may be positioned directly under the opening and be used as the means by which the crop is fed up into the bale chamber. The surface of the slotted top panel of the pickup is preferably inclined upwardly and rearwardly at generally the same angle as the belts when they are "laid back", and is flush with the belts when they are in that condition.

BRIEF DESCRIPTION OF THE DRAWING FIGURES

A preferred embodiment of the invention is described in detail below with reference to the attached drawing figures, wherein.

Figure 5:
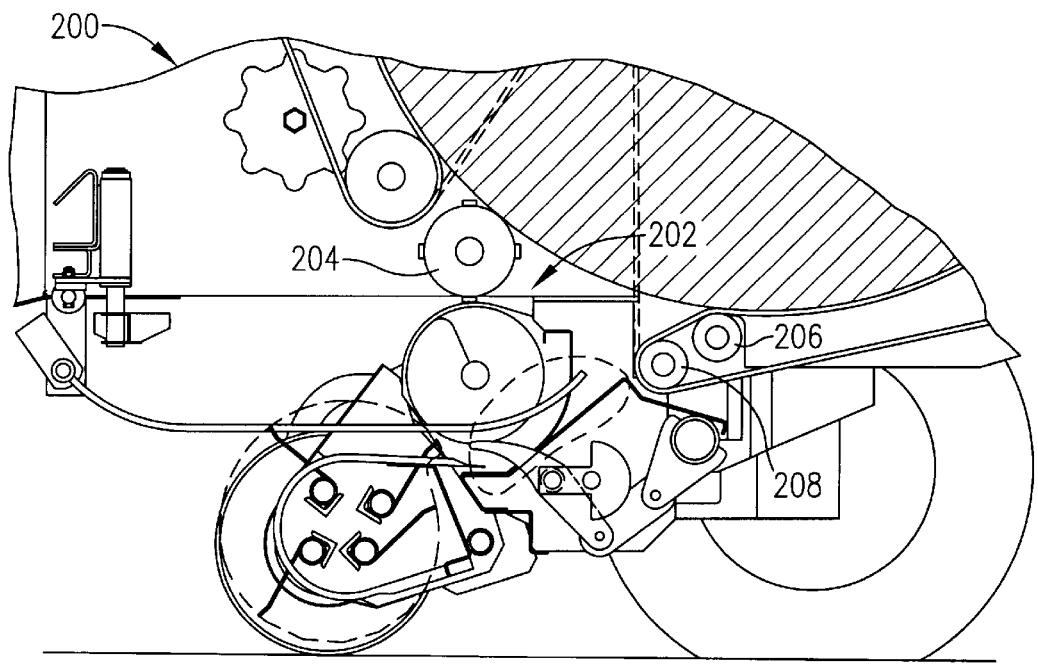
Figure 6:
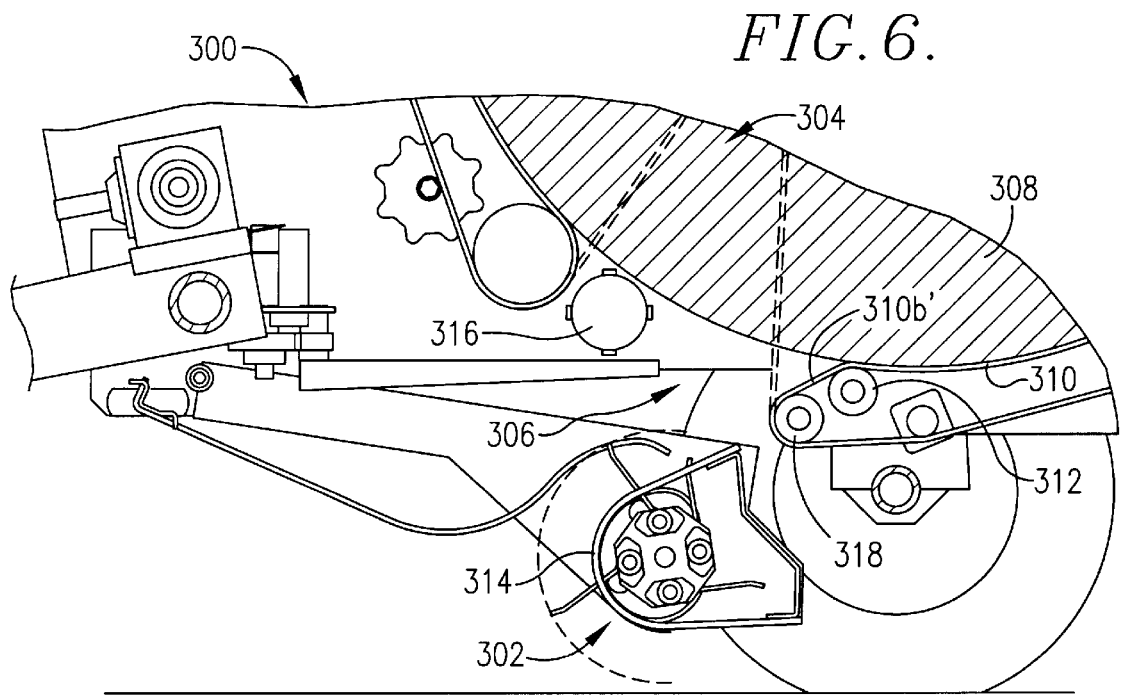

FIG. 5 is an enlarged, fragmentary, side elevational view of a second embodiment in which the front of the crop intake opening is defined by a starter roller, rather than a roll entrained by belts; and FIG. 6 is an enlarged, fragmentary, side elevational view of a third embodiment without an intermediate transfer mechanism wherein the pickup delivers crop material directly from the ground into the bale chamber.

DETAILED DESCRIPTION OF THE PREFERRED EMBODIMENT

Figures 1, 4:
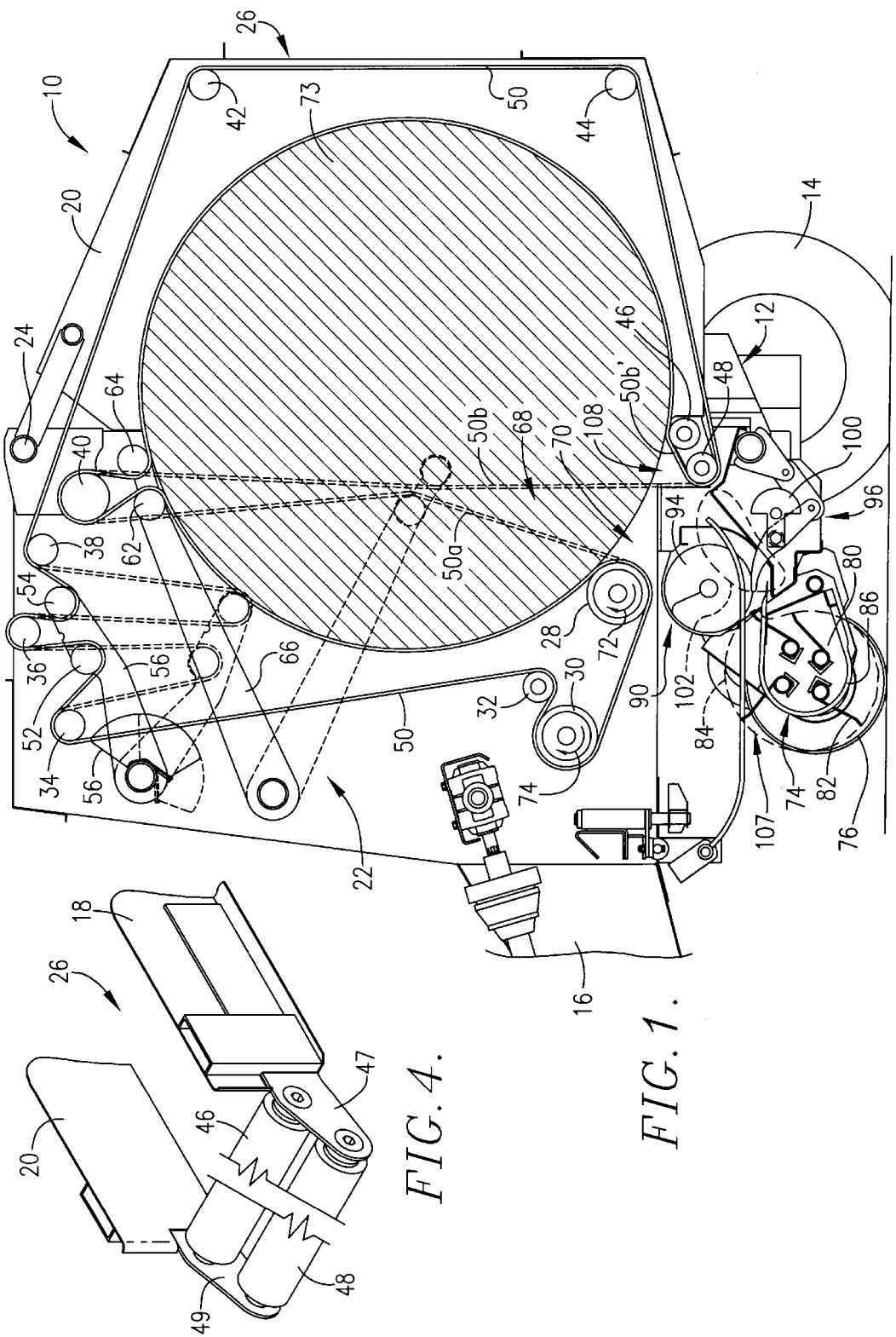
FIG. 1 is a fragmentary, side elevational view of a variable chamber round baler with its left sidewall removed to reveal internal details of construction, such baler employing the improved crop intake opening constructed in accordance with the present invention and showing in full lines a full size, ready-to-wrap bale within the baling chamber of the machine.
FIG. 4 is an enlarged, front perspective view of the intake rolls and structure for supporting the rolls on the sidewalls of the baler.

Turning now to FIG. 1, the round baler 10 selected for illustration generally includes a chassis 12 having ground wheels 14 and a forwardly extending tongue 16 that is adapted for connection with a towing vehicle (not shown). The chassis 12 carries a pair of upright, laterally spaced sidewalls 18 and 20 (see also FIG. 2) which cooperate to define a space within which bale forming and bale wrapping operations may be carried out as the baler is advanced across a field. Within the space defined by the sidewalls 18 and 20, the baler 10 further includes bale forming mechanism 22 for compacting and rolling crop material into a round bale.

The sidewalls 18,20 present stationary forward portions fixed to the chassis 12 by suitable means and rearward portions swingably attached to the forward portions by a pivot assembly 24. The rearward portions of the sidewalls 18,20 cooperatively define a tailgate 26 which is swingable between an open, discharge position (not shown), in which the tailgate 26 has sufficiently raised to allow a completely formed bale to be discharged from the baler 10, and a closed, baling position (FIG. 1), in which bale wrapping and rolling operations are performed.

In the illustrated embodiment, the bale forming mechanism 22 and sidewalls 18,20 cooperate to define a so-called "variable chamber," belt-type machine, wherein the baling chamber is initially relatively small and then grows progressively larger as the bale increases in diameter within the baler 10. The bale forming mechanism 22 of the variable chamber baler illustrated herein include a series of cooperating belts and rolls supported by the sidewalls 18,20 for rolling and compacting a bale as it forms within the baler 10. Turning particularly to FIG. 1, the baler 10 is provided with a plurality of laterally extending, stationary rolls including a pair of drive rolls 28 and 30, idler rolls 32,34,36,38,40,42, 44, and a pair of lower rolls mounted to the tailgate 26 and spaced relatively close to one another including a rear, bale supporting tailgate roll 46 and a front tailgate roll 48. As shown in FIG. 4, a pair of left and right mounting brackets, 47 and 49 respectively, extend forwardly from the sidewalls 18 and 20 of the tailgate 26 to support the tailgate-mounted intake rolls, 46 and 48 respectively, in the positions indicated in FIG. 1. Furthermore, the rear intake roll 46 is spaced upwardly and rearwardly from the front roll 48, for purposes which will subsequently be described. The rolls 28–48 span the sidewalls 18,20 and are arranged in a generally circular pattern viewing FIG. 1 for guiding a plurality of endless, laterally spaced, side-by-side belts 50 as the belts 50 are driven linearly during bale formation and wrapping.

The bale forming mechanism further includes a pair of movable slack takeup rolls 52 and 54 mounted near the upper portion of the baler 10 on downwardly spring biased arm structure 56 to maintain tension on the belts 50, yet permit the paying out of stored slack as the bale increases in diameter during formation. Although not illustrated in detail, it will be appreciated that the arm structure 56 carries a plurality of laterally spaced tracking guides 58 (FIG. 1), each of which are disposed within the corresponding spaces 60 (see FIG. 2) defined between adjacent belts 50 for preventing lateral shifting of the belts. Near the fore-and-aft center of the baler 10, the belts 50 are looped under the rear drive roll 28, over the upper idler roll 40, and under the front tailgate roll 48 to present a pair of opposed, front and rear belt stretches 50a and 50b, which are initially generally upright, as illustrated in phantom in FIG. 1, but which become bowed out in fore-and-aft directions, as illustrated in solid lines, as the bale grows beyond its initial starting core dimensions. A pair of retaining rolls 62 and 64 are mounted on a second swingable arm structure 66 that is also spring biased downwardly to the phantom line position in FIG. 1; the retaining rolls 62,64 receiving the belt stretches 50a and 50b therebetween so as to form a baling chamber 68 between the stretches 50a, 50b which is bounded at the sides by the sidewalls 18,20.

Figure 2:
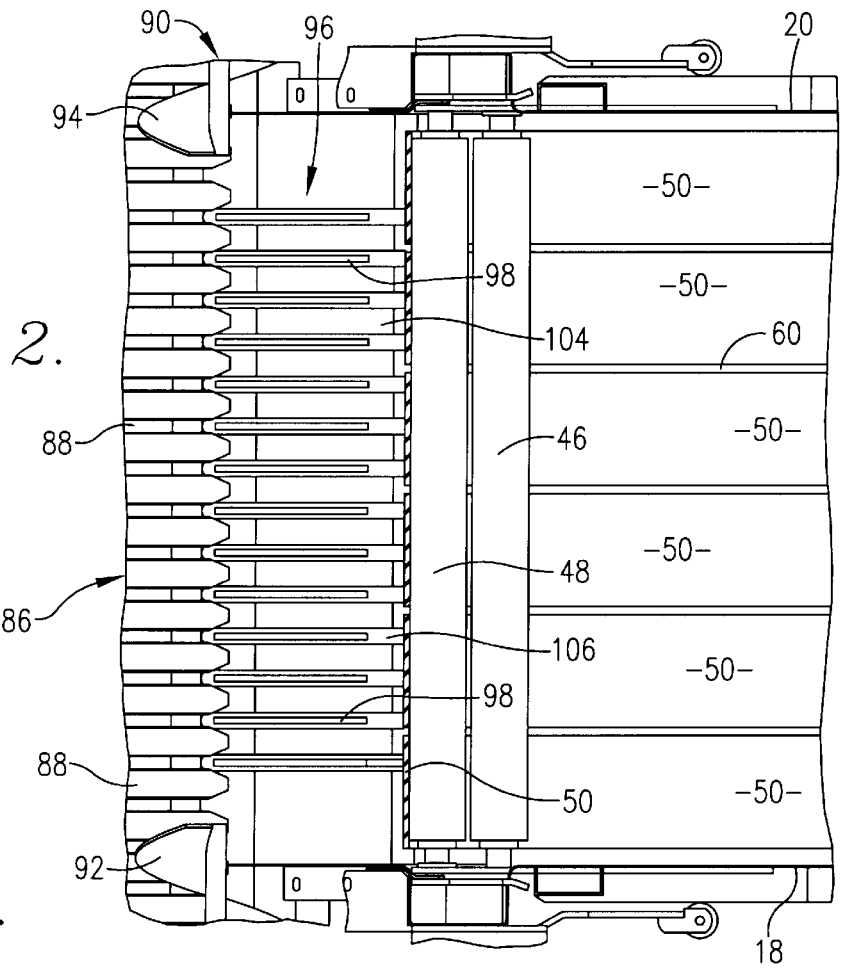
FIG. 2 is an enlarged, fragmentary, horizontal cross-sectional view of the intake baler looking downwardly from a point just above the rear intake rolls.
Figure 3:
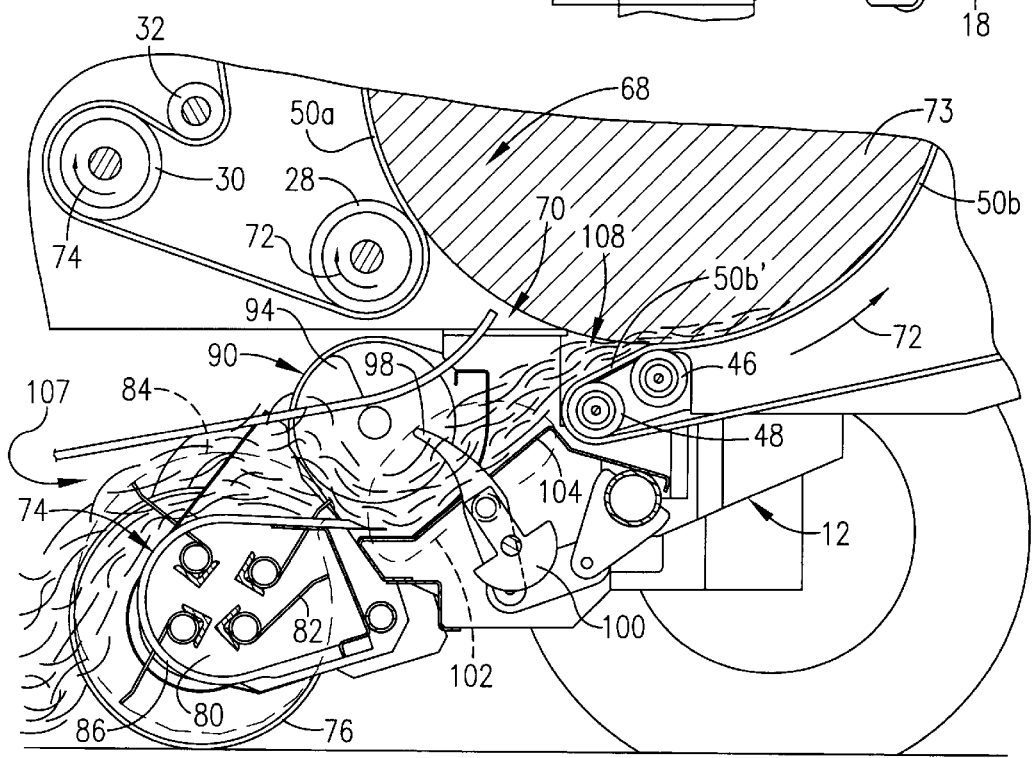
FIG. 3 is an enlarged, fragmentary, side elevational view of the lower portion of the baler illustrated in FIG. 1, particularly illustrating the flow of crop material as it is picked up off the ground by the pickup, transferred from the pickup to and through the intake opening by the transfer mechanism, and drawn through the nip defined between the bale and lower intake rolls.

The chamber 68 illustrated in FIGS. 1–3 is open at the bottom to present a crop intake opening 70 that is defined between the rear drive roll 28 and the front tailgate roll 48, the opening 70 being discussed in detail hereinbelow. It will be appreciated that the rear drive roll 28 and front tailgate roll 48 are sometimes collectively referred to as the fore-and-aft spaced, inlet rolls. The drive rolls 28 and 30 are drivingly coupled with the power source of the towing vehicle to drive the belts 50 and are driven in clockwise directions viewing FIG. 1, as indicated by arrows 72 and 74, respectively. Thus, when the baling chamber 68 is in its initial upright condition, as shown in phantom in FIG. 1, the front stretch 50a is moving generally downwardly and forwardly while the rear stretch 50b is moving generally upwardly. Consequently, hay introduced into the chamber 68 via the crop intake opening 70 is acted upon by the upwardly moving rear stretch 50b and the downwardly moving front stretch 50a so as to tumble forwardly, or in the direction indicated by arrow 72 in FIG. 3, and coil into a bale 73.

A wide crop pickup 74, supported generally below and forwardly of the crop intake opening 70, is operable to lift crop material off the ground as the baler 10 is advanced across a field. In the illustrated embodiment, the pickup 74 projects beyond the sidewalls 18,20 so that a large windrow that is wider than the baler itself may be delivered to the chamber 68. In short, the preferred pickup 74 includes adjustable gage wheels 76 (only one being illustrated) for maintaining the elevation of a retracting tire reel 80 as the baler 10 passes over uneven ground. Rotation of the pickup reel 80 drives the tines 82 along the path best illustrated in phantom in FIGS. 1 and 3, generally denoted by the numeral 84. The pickup 74 further includes a generally U-shaped panel 86 extending forwardly from the chassis 12 and having a plurality of laterally spaced slots 88 through which corresponding tines 82 project as the tines move upwardly and rearwardly along the path 84. As perhaps shown best in FIG. 3, as the crop material is picked up off the ground, it flows along the outer upper surface of the panel 86.

Immediately downstream from the pickup 74 is a transfer mechanism, generally denoted by the numeral 90, which serves to centralize the flow of crop material from the pickup 74 and transfer it to the intake opening 70. The transfer mechanism 90 preferably includes a pair of center-gathering, left and right stub augers, 92 and 94, respectively. It will be appreciated that the augers 92,94 are driven to converge the flow of crop material to a width generally equal to the width of the baling chamber 68. The fork-type stuffer 96, having a plurality of laterally spaced prongs 98, is driven by crank 100 along a path 102 to feed the converged flow of crop material rearwardly through the crop inlet 70 and into the chamber 68. An inclined ramp 104 positioned between the intake opening 70 and the panel 86 of the pickup 74 has a plurality of laterally spaced slots 106, each configured for receiving a corresponding prong 98. As indicated by the path 102, the prongs 98 project through the slots 106 of the ramp 104 as they move rearwardly to transfer crop material along the ramp.

It will be appreciated that the pickup 74 and stub augers 92,94 provide a relatively continuous flow of crop material to the stuffer 96, while the stuffer 96 is operable for transferring the material to the opening 70 only as the prongs 98 are cranked rearwardly. Of course, no material is transferred by the stuffer 96 while the prongs 98 are returned to their forwardmost position. Accordingly, although the stuffer 96 is driven at relatively high speeds, it is limited to transferring in successive charges rather than a continuous stream. Nonetheless, the stuffer 96 has proven very successful in transferring high moisture silage crop through the opening 70. The pickup 74 and transfer mechanism 90 discussed hereinabove are disclosed in a contemporaneously filed patent application, Ser. No. 08/731,764, filed Oct. 18, 1996, entitled DOWN TURNING STUB AUGERS ON WIDE PICK-UP FOR ROUND BALERS, in the names of Howard J. Ratzlaff and J. Dale Anderson. As those of ordinary skill in the art will appreciate, a so-called "open throat" baler is illustrated in the drawings in view of the fact that the throat area, generally referenced by the numeral 107 and leading from the front of the pickup to the baling chamber, is completely open and unobstructed, without the presence of compression rollers or the like.

CROP INTAKE OPENING 70

Initially, the baling chamber 68 assumes a bale-starting configuration, which is generally upright and somewhat triangular, as shown in phantom lines in FIG. 1, with the retaining rolls 62,64 at the apex of the chamber 68. As previously indicated, this chamber configuration is highly effective in establishing a bale core (not shown). Particularly, the belt stretches 50a,50b serve to coil and trap crop material therebetween at a location spaced upwardly from the opening 70 until a relatively small core of material is formed. At this time, the rear belt stretch 50b extends generally upwardly from the front tailgate roll 48 and is disengaged from the rear bale supporting roll 46.

As hay is added to the core, the chamber 68 becomes distended and circular in transverse configuration as the growing bale 73 pushes forwardly on the belt stretch 50a and rearwardly on the belt stretch 50b to cause additional slack to be paid out and the arm 66 to rise. As best shown in FIG. 3, the progressively growing bale 73 eventually shifts rearwardly into supporting engagement with the rear tailgate roll 46, whereby the rear belt stretch 50b is laid down into engagement with the rear tailgate roll 46 and presents an inclined, upwardly and rearwardly moving surface 50b' (FIG. 3) extending from the front roll 48 to the rear roll 46. At this time and for the remainder of bale formation, the revolving bale 73 rests primarily upon the upper, support surface of the rear tailgate roll 46 at a point spaced upwardly and rearwardly from the intake opening 70.

This configuration provides several benefits over conventional crop intake openings. For example, with the rear tailgate roll 46 supporting the bale 73 at a point spaced generally upwardly and rearwardly from the front tailgate roll 48, the bale does not interfere with the inflow of crop material. Although the bale 73 may sag and lose its generally circular cross-sectional configuration as it disengages the belts between the drive roll 28 and rear roll 46, the bale remains spaced from the chamber inlet 70 so that the sagging portion of the bale does not interfere with the inflow of crop material. As will be described in greater detail below, the moving surface 50b' presented by the rear belt stretch 50b serves to effectively deliver crop material from the opening 70 to the upwardly and rearwardly spaced bale 73. Therefore, with the present invention, crop material has less difficulty getting through the inlet opening than in the past, i.e., the inlet is "eased."

Preferably, the moving surface 50b' is generally aligned and flush with the ramp 104 so that the crop material flows along a generally straight path as it moves toward the bale 73, thereby further minimizing interference with the flow of crop material into the baling chamber 68. Moreover, as shown in FIGS. 1 and 3, the bale 73 and moving surface 50b' cooperatively define a large wedge 108, which presents a highly aggressive nip that grasps and pulls the crop material beneath the growing bale. It will be appreciated that even with a bale that sags out of its normally circular configuration between the front belt stretch 50a and rear belt stretch 50b, the moving surface 50b' slopes sufficiently downwardly and away from the bale 73 to remain at least partially disengaged from the sagging bale and cooperate with the bale to present the aggressive nip. Accordingly, the sagging portion of the bale is prevented from obstructing the engagement between the inflowing crop material and the belts, as often occurs with the conventional balers. As those of ordinary skill in the art appreciate, in conventional balers, the sagging portion of the bale overhang has a tendency to cover the forward boundary of the support roll and prevent the formation of an aggressive nip between the belts and bale.

The crop intake opening 70 of the present invention provides effective and unobstructed flow of crop material into the baling chamber, which is critical to baling operations. Additionally, the enlarged, aggressive nip formed by the large wedge 108 between the bale 73 and moving surface 50b' has proven to be particularly helpful in baling relatively high-moisture silage, especially when successive charges of material are transferred by the intermediate stuffer 96. The improved intake arrangement produces a surprisingly powerful pulling force on the material entering the chamber. Even in some instances where the stuffer 96 has been inoperative, it has been observed that the moving surface 50b' and revolving bale 73 are able to draw material from the pickup 74, along the ramp 104 of the stuffer, and into the baling chamber 68.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the pair of intake rolls 46,48 may be provided on variable chamber, belt-type round balers other than the baler 10 illustrated in FIGS. 1–3. In this respect, FIG. 5 shows an alternative baler 200, in which the forward boundary of the crop intake opening 202 is defined by a starter roll 204, which assists in establishing the initial bale core. In accordance with the principles of the present invention, a pair of tailgate-mounted intake rolls 206,208 are positioned adjacent the intake opening 202, with the front intake roll 208 defining the rear boundary of the intake opening. As illustrated in FIG. 6, an alternative baler 300 is provided with a pickup 302 that is the same width as the baler. The baler 300 does not include a transfer mechanism, such as the center gathering stub augers 92,94 and stuffer 96 illustrated in FIGS. 1–3, and accordingly, crop material is picked up off the ground and delivered directly into the chamber 304 through the intake opening 306 by the pickup 302. Once the bale 308 has grown sufficiently to shift the belts 310 into engagement with the rear intake roll 312, the moving surface 310b' presented by the belts 310 is generally aligned with the panel 314 of the pickup 302, similar to the stuffer ramp 104 illustrated in FIGS. 1–3. This embodiment also employs a starter roll 316, which cooperatively defines the crop intake opening 306 with the front tailgate-mounted intake roll 318.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. In a round baler, the improvement comprising:

a plurality of transverse rolls and a plurality of laterally spaced belts entraining said rolls, said rolls and belts cooperatively defining a baling chamber expandable from an initial, generally upright, bale-starting configuration, said baling chamber having a crop intake opening adjacent the bottom of the chamber through which crop material is delivered to the chamber during formation of a bale, said rolls including a lower front roll and a lower rear roll which are located behind said opening, said lower rear roll having a bale supporting surface that is positioned generally upwardly and rearwardly from the lower front roll for spacing the bale away from the lower front roll as the chamber expands from the bale-starting configuration, said belts including a stretch that extends generally upwardly from the lower front roll when said chamber is in the bale-starting configuration and shifts into engagement with the lower rear roll as the chamber expands, whereby said belt stretch presents a moving surface extending generally rearwardly and upwardly from the lower front roll to the lower rear roll, with at least part of the moving surface being disengaged from the bale when the bale is supported by the supporting surface of the lower rear roll, for delivering crop material from the intake opening to the bale.

2. In a round baler as claimed in claim 1, said front and rear rolls being disposed along an axis extending generally upwardly and rearwardly from the intake opening, said axis being substantially parallel to the moving surface.

3. In a round baler as claimed in claim 2, said lower front and rear rolls having substantially similar cross-sectional diameters.

4. In a round baler as claimed in claim 1, said lower front roll cooperating with another one of the rolls entrained by the belts to define the crop intake opening.

5. In a round baler as claimed in claim 1;

a pickup ahead of the intake opening for lifting crop material off the ground as the baler moves across the field; and transfer mechanism for moving picked up crop material from the pickup to the baling chamber including a device for presenting successive charges of material to the intake opening.

6. In a round baler as claimed in claim 5, said device being a fork-type stuffer including a plurality of laterally spaced prongs which are cranked along a generally kidney-shaped path extending between the pickup and intake opening, said stuffer further including a slotted ramp through which the prongs project as they cooperatively transfer charges of crop material along the ramp and toward said opening.

7. In a round baler as claimed in claim 6, said ramp being substantially parallel to said moving surface presented by the belts.

8. In a round baler as claimed in claim 7, said ramp being generally aligned with said moving surface.

9. In a round baler as claimed in claim 8; and a pickup ahead of the intake opening for lifting crop material off the ground as the baler moves across the field, said pickup including a plurality of laterally spaced tines driven in a generally circular pattern, and a slotted panel through which the tines project as they cooperatively pick up material off the ground.

10. In a round baler as claimed in claim 9, said panel being substantially parallel to said moving surface presented by the belts.

11. In a round baler as claimed in claim 10, said panel being generally aligned with said moving surface.

12. In an open throat, variable chamber, belt-type round baler wherein the initially relatively small baling chamber is generally centered above the inlet to the chamber and extends at least generally upwardly therefrom, said chamber expanding in such a manner during formation of the bale that the chamber and the bale shift rearwardly away from the inlet as the bale grows and the forming process continues, the improvement comprising:

a plurality of transverse rolls and a plurality of laterally spaced belts entrained around said rolls, said plurality of rolls including a pair of front and rear inlet rolls located generally at the bottom of said chamber and defining the front and rear boundaries of said inlet, said plurality of belts including a pair of oppositely moving, front and rear belt stretches looped under respective ones of said inlet rolls and extending generally upwardly therefrom when the chamber is initially relatively small;

a pickup ahead of said inlet for lifting crop material off the ground as the baler moves across a field; and transfer mechanism for moving picked up crop material from the pickup to the baling chamber including a device for presenting successive charges of material to the inlet, said plurality of rolls further including a bale supporting roll having an upper surface disposed in such a position upwardly and rearwardly from the rear inlet roll that the rear belt stretch and bale are spaced forwardly from the supporting roll when the chamber is initially relatively small and shift rearwardly into supporting engagement with the supporting roll as the bale grows and the chamber expands toward full size.

13. In a round baler as claimed in claim 12, said device being a fork-type stuffer including a plurality of laterally spaced prongs which are cranked along a generally kidney-shaped path extending between the pickup and intake opening, said stuffer further including a slotted ramp through which the prongs project as they cooperatively transfer charges of crop material along the ramp and toward said opening.

14. In a round baler as claimed in claim 13, said rear belt stretch presenting a moving surface extending generally upwardly and rearwardly from the rear inlet roll to the supporting roll when said rear belt stretch and bale shift into supporting engagement with the supporting roll, said ramp being substantially parallel to said moving surface.

15. In a round baler as claimed in claim 14, said ramp being generally aligned with said moving surface.

16. In a round baler as claimed in claim 15, said pickup being wider than the baler for picking up a wide windrow, said transfer mechanism including a pair of center-gathering stub augers interposed between the pickup and the stuffer for converging picked up crop material from the pickup centrally toward the stuffer.

17. In a round baler as claimed in claim 16, said aft inlet roll and said supporting roll having substantially similar cross-sectional diameters.

18. In a round baler as claimed in claim 12, said aft inlet roll and said supporting roll having substantially similar cross-sectional diameters.

* * * * *